Feb. 28, 1967  H. A. BEALL, JR., ETAL  3,306,159
ANGLE TRANSDUCER EMPLOYING POLARIZED LIGHT
Filed June 19, 1963

INVENTORS
HORACE A. BEALL JR.
CHARLES A. CALL
BY
Ernest L. Brown
ATTORNEY 3,306,159
ANGLE TRANSDUCER EMPLOYING POLARIZED LIGHT
Horace A. Beall, Jr., Los Alamitos, and Charles A. Call, Brea, Calif., assignors to North American Aviation, Inc.
Filed June 19, 1963, Ser. No. 289,109
1 Claim. (Cl. 88—14)

This invention pertains to an angle transducer and more particularly to an optical means for measuring the angle of a shaft, or the like.

With the demand for increased precision of control of missiles, aircraft, and the like, it has become important that more accurate angle transducers be obtained for use in the controlling servo systems.

A device of this invention is a novel angle transducer which is adapted to measure the angle of rotation of a supporting member such as—for example—a shaft.

To the end of producing a more accurate angle transducer, the device of this invention—in one particular embodiment—uses a polarizing disc attached to the shaft whose angle is to be measured and a source of non-polarized light to generate polarized illumination whose direction of polarization is a measure of the angle of the shaft, together with appropriate polarizing filters to identify the direction of polarization of polarized light and to channel polarized light in proper phase sequence to appropriate photoelectric members which are connected in a bridge to generate a signal which is a measure of the angle of rotation of the polarizing disc about its axis of rotation.

It is therefore an object of this invention to more accurately measure the angle of rotation of a supporting member.

It is also an object of this invention to more accurately measure the angle of rotation of a shaft.

It is also an object of this invention to generate an electrical signal which is a measure of the rotation of a supporting member.

It is a more particular object of this invention to use radiation polarizing means attached to a member whose angle of rotation is to be measured to polarize the radiation, together with the means for detecting the direction of polarization of the resulting polarized radiation, said direction of polarization being a measure of the angle of rotation of the supporting member.

It is a more specific object of this invention to provide a machine and apparatus which is designed to achieve the above-enumerated objects.

Figure 1:
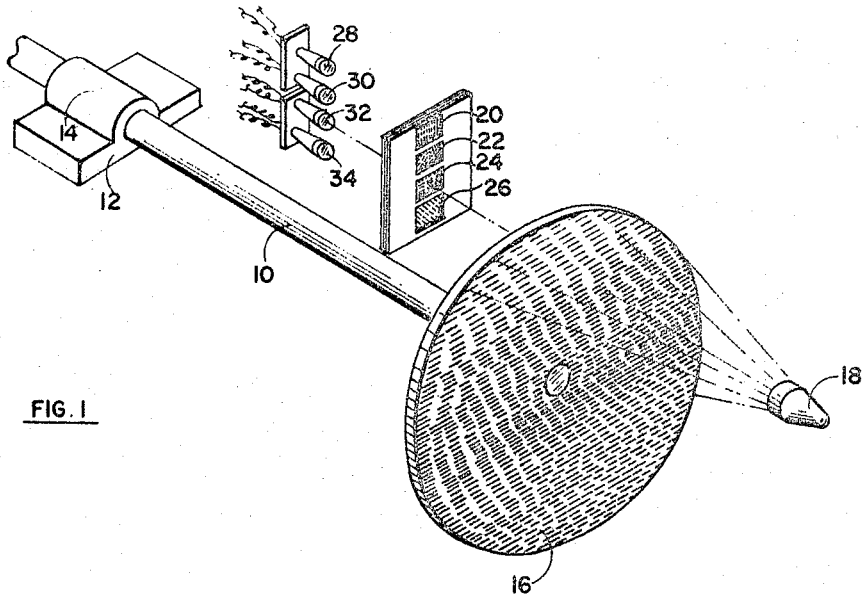
Figure 2:
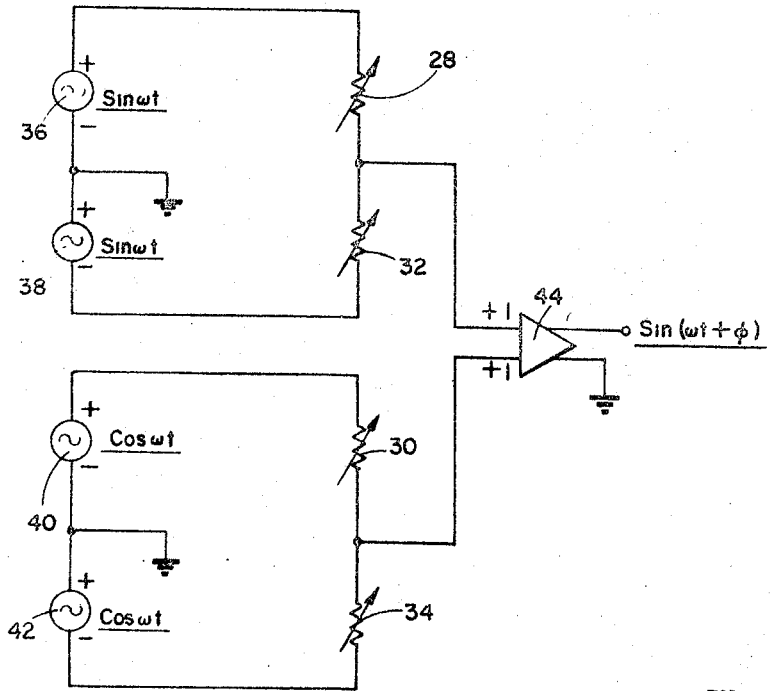

Other objects will become apparent from the following description taken in connection with the accompanying drawings in which FIGURE 1 is a perspective view of a typical angle transducer in accordance with this invention;

And, FIGURE 2 is a schematic diagram of an alternating current bridge in which the photoelectric elements of FIGURE 1 are shown as photosensitive resistors.

In FIGURE 1, a rotatable supporting member 10—for example a shaft—is adapted to rotate relative to a fixed reference 12. Shaft 10 may be mounted upon a bearing 14 relative to fixed reference 12.

Mounted upon supporting member 10 is a polarizing means 16 which, in its preferred embodiment, is a disc of polarizing material. The disc 16 is mounted with the plane of its surfaces substantially perpendicular to the axis of rotation of shaft 10.

A source of non-polarized radiation such as a light source 18 is mounted to illuminate a portion of polarizing means 16. The light which is transmitted through polarizing means 16 is polarized in a direction which is a measure of the angle of rotation of shaft 10. The direction of polarization in the example of FIGURE 1 is shown by the dashed lines.

In the preferred embodiment of FIGURE 1, four polarizing filters 20, 22, 24, and 26 are mounted in the light path of the light which is polarized by disc 16. A means (not shown) is preferably provided to prevent unpolarized light from striking filters 20, 22, 24, and 26. The direction of polarization of filters 20, 22, 24, and 26 is shown by the dashed lines in FIGURE 1. If the angle of polarization of filter 20 is taken as a reference at 0 and 180°, the direction of polarization of filter 22 is 45 and 225°, the direction of polarization of filter 24 is 90 and 270°, and the direction of polarization of filter 26 is 135 and 315°. Thus, for example, when light strikes filter 20 at 0 and 180° polarization the light transmitted through filter 20 reaches a maximum intensity. When light strikes filter 20 at an angle of 90 or 270° the light transmitted by filter 20 is a minimum.

Photoelectric means 28, 30, 32, and 34 are positioned to collect the light transmitted by polarizing filters 20, 22, 24, and 26. Light baffles (not shown) are preferably inserted to prevent the light from a particular filter 20, 22, 24, and 26 from entering the wrong photoelectric device 28, 30, 32, and 34.

Each of the photoelectric devices 28, 30, 32, and 34 may—for example—be photo resistors whose resistance varies sinusoidally about some fixed value of resistance. The photo sensitive resistors 28, 30, 32, and 34 are connected as shown in FIGURE 2 into an alternating current bridge with alternating voltage sources 36, 38, 40, and 42 connected as shown. Voltage sources 36, 38, 40, and 42 may be the secondary windings of transformers which are connected to a two-phase voltage source (not shown). The outputs of each of the bridges are connected to the inputs of a summing amplifier 44 whose electrical output is a measure of the angle of rotation of shaft 10 about its axis of rotation. If the frequency of the alternating voltage sources 36, 38, 40 and 42 is high relative to the angular frequency of shaft 10, i.e., at least ten times as high, the electrical output of summing amplifier 44 is an alternating voltage whose frequency is that of voltage sources 36, 38, 40, and 42 and whose phase is a measure of the angle of rotation of shaft 10 about its axis of rotation.

It is to be understood that in its broadest aspects other sources of radiation—for example—electromagnetic radiation in the microwave region could be used in place of an illumination source 18. A directionally polarizing mechanism such as a rectangular wave guide could be used in place of polarizing member 16, directionally polarizing wave guides or antennas can be used in place of polarizing filters 20, 22, 24, and 26, and the outputs of such filters could be converted to low frequency signals whose phase is a measure of the angle of rotation of shaft 10.

It is to be understood that since angular velocity is relative, the structure described above may be inverted. It is only necessary to consider shaft 10 standing still while support 12 turns to perceive that disc 16 may be held stationary while filters 20, 22, 24, 26, sensors 28, 30, 32, 34, and source 18 turn as a unit with the device whose angular velocity is being measured.

The source 18 of unpolarized light is shown stationary. However, source 18 may be moving. Source 18 must illuminate member 16 in line with filters 20, 22, 24, 26 and sensors 28, 30, 32, 34.

Further, element 16 may rotate independently while elements 20, 22, 24, 26, 28, 30, 32, 34 rotate as a unit to measure the relative rather than absolute angular velocity of two rotating members.

In operation, as shaft 10 rotates the direction of polarization of the light transmitted from non-polarized light source 18 through polarizing material 16 becomes polarized in a direction which is determined by the direction of polarization of the material 16 and the angle of angular position of shaft 10.

As the light delivered to filters 20, 22, 24, and 26 varies in direction of polarization with shaft 10, the light intensity of the light delivered to photoelectric devices 28, 30, 32, and 34 varies sinusoidally with the angle of rotation of shaft 10. The sinusoidal illumination intensity delivered to photoelectric devices 28, 30, 32, and 34 differ from each other by 90 electrical degrees. As the polarizing material 16 rotates through 90 mechanical degrees, the alternating component of light intensity received by numbers 28, 30, 32, and 34 goes through 180 electrical degrees. Thus, the device of this invention measures twice the angle of mechanical rotation of shaft 10.

In the operation of the circuit of FIGURE 2, the photosensitive elements 28, 30, 32, and 34 have resistances which vary sinusoidally with the light intensity received by them. The resistances are always positive and vary between a maximum and minimum value. Thus the voltage at the output of each of the two bridges are sinusoidal functions of Ω, the frequency of voltage sources 36, 38, 40, and 42 with the amplitude a sinusoidal function of the angle of rotation of shaft 10. The amplitudes at the outputs of the two bridges are 90° out of phase with each other and, when summed by summing amplifier 44 generate a signal which is a sinusoidal function of the frequency Ω with a phase angle which is a measure of twice the angle of rotation of shaft 10.

Thus, the device of this invention is a novel angle transducer which has increased accuracy and which is adapted—for example—to be used as a sensing element in a servo system.

Although the device of this invention has been described in detail above, it is not intended that the invention should be limited by the description but only by the spirit and scope of the appended claim.

We claim:

In combination:

a rotatable member;

a sheet of polarizing material attached to said member in a plane which is perpendicular to the axis of rotation of said member, adapted to polarize light which is substantially parallel to the axis of rotation of said member;

a source of non-polarized light positioned and adapted to illuminate said sheet of polarizing material;

a plurality of orthogonally related pairs of polarizing filters whose directions of polarization are substantially different from each other, each adapted to polarize light transmitted by said rotatable sheet of polarizing material and to transmit said polarized light with maximum intensity when the direction of polarization is aligned with the direction of polarization of each of said filters and to transmit said polarized light with minimum intensity when the direction of polarization is perpendicular to the direction of polarization of each of said filters;

a plurality of photoelectric sensing elements each associated with a different one of said polarizing filters to sense the light intensity transmitted by each of said filters, a plurality of alternating current bridges, one for each pair of polarizing filters, operatively coupled to said photoelectric sensing elements, and means coupled to the outputs of said alternating current bridges for combining the outputs thereof to provide an alternating current signal whose phase angle is a measure of the angle of rotation of said rotatable member.

References Cited by the Examiner

UNITED STATES PATENTS

| | | | |
|---|---|---|---|
| 2,313,923 | 3/1943 | Chubb | 88—14 |
| 2,503,023 | 4/1950 | Berry | 88—14 |
| 3,248,549 | 4/1966 | Sanabria | 250—225 X |

FOREIGN PATENTS

| | | |
|---|---|---|
| 1,256,133 | 2/1961 | France. |

JEWELL H. PEDERSEN, *Primary Examiner.*

O. B. CHEW, *Assistant Examiner.*